2 Sheets—Sheet 1.
E. C. ALLEN.
Seed-Planter.
No. 26,006.             Patented Nov. 8, 1859
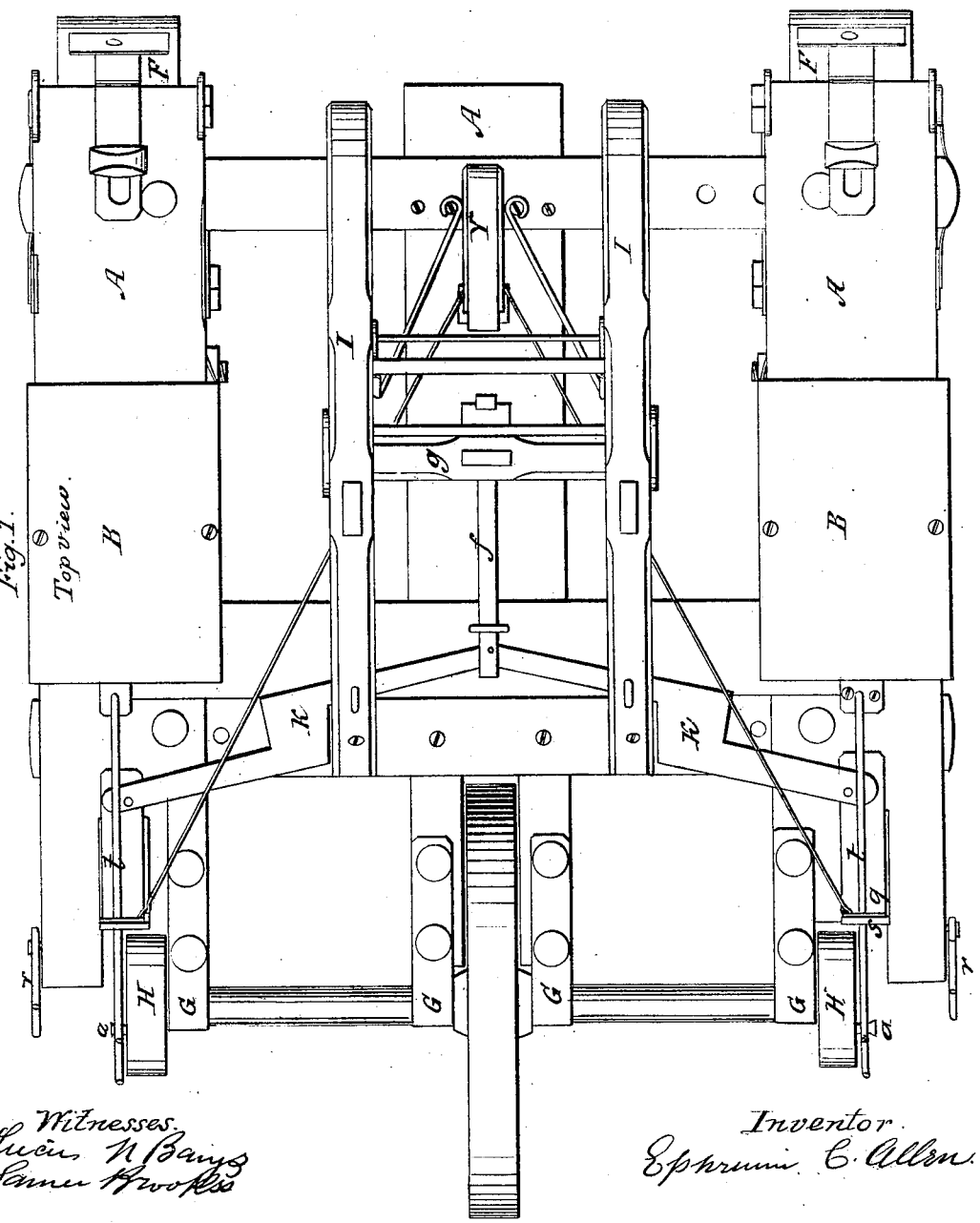

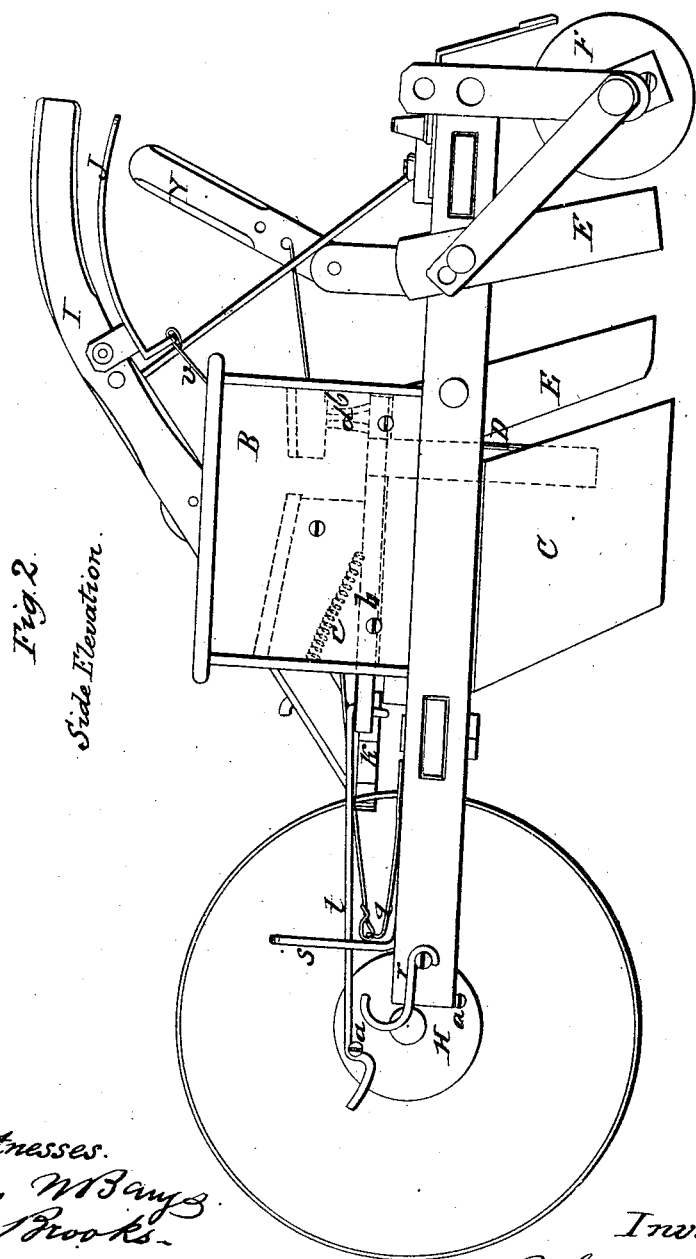

UNITED STATES PATENT OFFICE.

E. C. ALLEN, OF LE ROY, NEW YORK.

IMPROVEMENT IN CORN-PLANTERS.

Specification forming part of Letters Patent No. 26,006, dated November 8, 1859.

*To all whom it may concern:*

Be it known that I, EPHRAIM C. ALLEN, of the town of LeRoy, in the county of Genesee and State of New York, have invented a new and useful Improvement on a Machine for Planting Corn and other Grain and Seeds; and I do hereby declare that the following is a full and exact description of the construction and operation of the same, reference being had to the drawings accompanying, making a part of this specification, in which—

Figure 1 is a top view, and Fig. 2 a side view of the machine.

To enable others skilled in the art to make and use my invention, I will proceed to describe its construction and operation.

I construct a frame by three parallel pieces of timber of suitable size, letters A A A, Fig. 1, with mortises to receive two or three slats or cross-bars made to fit the mortises, so that the two side pieces can be moved either way on the slats or cross-bars to contract or widen the machine, as shall be desired by the operator to plant his seed in wider or narrower rows, and the center piece of timber to be made fast to the slats or cross-bars. On the two outside pieces of said timber are attached the boxes B B, Fig. 1, containing the seed, and on the under sides are attached an angular piece of plate steel or iron in the shape of the letter V, letter C, Fig. 2, with the angle in front. This is to prepare the ground for the seed by making a furrow or trench for the seed, and this angular piece of steel or iron to slant toward the rear on an angle of fifteen or twenty degrees. Next behind that is a tube, letter D, Fig. 2, connecting with the seed-box on the upper side, and through which tube the seed is precipitated to the ground. Next behind the tube is attached to the said timbers steel or iron plates E E, Fig. 2, so as to draw the earth over the seed when necessary, and at the rear or hind end of the timbers are attached wooden or iron rollers, letter F, Fig. 2, to roll the earth over the seed.

To the fore end of the principal timbers are attached round or loop fingers, letters G G G G, Fig. 1, to receive the shaft of a wheel, the end of the center piece of timbers to be mortised to receive the wheel, which is prepared to revolve like the wheel to a common wheelbarrow. A wheel is constructed of any suitable size—say two feet in diameter—and fastened to the middle timber so that it can revolve but not move sidewise. The ends of the shaft of the wheel pass through the hinges in the two side pieces in such a manner that the two side pieces can be contracted or widened on the slats, as before mentioned. On each end of the shaft is attached a cam-wheel, letters H H, Fig. 1, three or four inches in diameter, with screws or pins, letters A A, Figs. 1 and 2, attached to the outer sides.

On the top of the frame, and attached to a flat piece of timber fastened by screws to the center piece, are two handles, letters I I, Fig. 2, constructed in shape like the handles to a corn-cultivator, to guide and control the machine.

In the boxes that contain the seed are placed slides, letter *b*, Fig. 2, one for each box, passing through the center of the box and extending to the cam-wheel by means of a pitman or rod, letters *t t*, Figs. 1 and 2, on the end of the shaft of the wheel by means of a pitman connecting with the slide. On the fore end of the pitman is a hook or angle, so that when the wheel revolves the slides are drawn out by the pins or screws attached to the outer edge or side of the cam-wheels by the hook or angle of the pitman catching on the pin or screw and a cavity or orifice in that part of the slide which passes through the seed-box is then filled with seed, and after the end of the pitman has passed the pin or screw on the pinion-wheel the slide is then drawn forcibly back by a spiral spring, letter *c*, Fig. 2, attached to the inside of the seed-box to a hole made through the side timbers, so that the seed then drops through the hole and through the tube beneath to the ground.

To prevent any more seed than shall be wanted from entering the cavity in the slide, a brush, letter *d*, Fig. 2, is attached above it in the seed-box, which sweeps off all superfluous seed as the slide passes back to the hole. The cavity in the slides is so constructed as to be enlarged or contracted, so as to hold just the quantity which shall be desired.

Immediately back of the pitman-wheel, and far enough one side of it to let the pitman attached to the slide pass, is a thin piece of iron or steel, letters *s s*, Figs. 1 and 2, attached in an upright position to the side piece, with an oblong mortise through which the pitman passes. This mortise holds the pitman-rod to its place and serves to prevent the pitman-rod from falling too low down when it drops after the screw or pin has passed the hook or angle in the end of the pitman-rod. Near the fore ends, and on the outer side of the two side pieces of timber, are attached hooks to which the horse or other propelling power is attached to draw the machine, letter r, Figs. 1 and 2.

This machine is so constructed that rows can be planted crosswise or both ways. I construct of iron two triangular pieces, (designated by letter J, Fig. 2,) and attach to the under side of the handles, as represented in Fig. 2. I then construct a shaft and attach it to the handles some distance below the triangular pieces J.

The shaft is designated by the letter g, Fig. 1. This shaft is so confined to the handles that it can roll backward and forward. On each side of the shaft, and near the handles, I insert two upright pieces of wood, and to the upper ends of which I attach one end of a wire, and the other end of the wire I attach to the lower end of the angle of the triangular pieces J. This wire is represented on Fig. 2 by the letter V, and the manner of attaching it to the said triangular piece J. In the center of the shaft, and on the under side, I mortise in a perpendicular piece of wood, the lower end of which reaches down to the upper surface of the machine. To this perpendicular piece, at the lower end, I attach a horizontal piece, letter f in Fig. 1, projecting forward. I then construct two transverse pieces of flat wood, K K, Fig. 1, and fasten them near the center to the upper surface of the machine by pins or screws on which they can play. I then attach the inside ends of the transverse levers K K to the forward end of the piece f. The other end of the transverse levers I connect with the forward ends of the slides (having first removed the pitmen) by short hooks. By pressing the hand on the upper end of the triangular pieces J upward toward the handles the wires attached to the lower ends of these pieces draw upon the upright levers in the shaft, which turns that toward that operator, and that presses the perpendicular lever underneath the shaft, with the flat piece f attached to it, forward, and that being connected with the inner ends of the transverse levers causes them to move on the pins attaching them to the machine, and that action of the transverse levers draws out the slides of the seed-boxes, to which slides they are attached by the said hooks, and then the slides are drawn back by the spiral springs, the same as before mentioned when operated by the pitmen.

On the top of the middle piece of timber I construct and attach a lever, letter Y, Fig. 1, and connect it with springs under the end of the pitmen, letter Q, Fig. 2, so that by pressing on the end of the lever it raises the ends of the pitmen so that the pitmen are not caught by the pins or screws on the sides of the small wheels, and consequently no seed will be dropped. This is done when the operator does not wish to feed the machine or drop seed.

When the machine is in operation, as the main or large center wheel revolves, the cam-wheels at ends of the shaft, with the pins or screws on the outer edges, catch the pitmen on the ends of the slides and draw them through a partition in the seed-boxes, when and where the cavities are filled. Then as the slides are drawn back through the partition the brush sweeps off the superfluous seed, and the seed is dropped through the hole in the timber and tube as before stated, and the width of the rows can be regulated, as desired, by driving the side pieces or timbers on the slats or cross-bars nearer together or farther apart; and the distance of the hills in each row can be regulated by the pins or screws on the outer edges of the cam-wheels, so that the hills can be near or remote at the discretion of the operator.

By this contrivance beans as well as corn and all kinds of seeds which require to be planted in rows can be planted in a manner to suit the taste or wisdom of the operator.

What I claim as my invention, and desire to secure by Letters Patent, is—

The arrangement of the various parts of the seeding-machine herein described, when the whole are constructed and combined for operation conjointly, as and for the purposes in this specification herein set forth.

EPHRAIM C. ALLEN.

Witnesses:
  LUCIUS N. BANG,
  JAMES BROOKS.